United States Patent
Wilkins (10) Patent No.: US 9,247,257 B1
(45) Date of Patent: Jan. 26, 2016

(54) SEGMENTATION BASED ENTROPY ENCODING AND DECODING

(75) Inventor: Paul Wilkins, Cambridge (GB)

(73) Assignee: GOOGLE INC., Mountain View, CA (US)

( * ) Notice: Subject to any disclaimer, the term of this patent is extended or adjusted under 35 U.S.C. 154(b) by 1005 days.

(21) Appl. No.: 13/307,216

(22) Filed: Nov. 30, 2011

(51) Int. Cl.
*H04N 19/174* (2014.01)
*H04N 19/124* (2014.01)
*H04N 19/645* (2014.01)

(52) U.S. Cl.
CPC ........... *H04N 19/174* (2014.11); *H04N 19/124* (2014.11); *H04N 19/645* (2014.11)

(58) Field of Classification Search
CPC .. H04N 19/124; H04N 19/14; H04N 19/6457
See application file for complete search history.

(56) References Cited

U.S. PATENT DOCUMENTS

| | | |
|---|---|---|
| 4,710,810 A | 12/1987 | Koga |
| 4,924,310 A | 5/1990 | von Brandt |
| 5,148,269 A | 9/1992 | de Haan et al. |
| 5,150,209 A | 9/1992 | Baker et al. |
| 5,260,783 A * | 11/1993 | Dixit ........................ 375/240.13 |
| 5,337,086 A | 8/1994 | Fujinami |
| 5,398,068 A | 3/1995 | Liu et al. |
| 5,461,423 A | 10/1995 | Tsukagoshi |
| 5,469,273 A | 11/1995 | Demura |
| 5,510,842 A | 4/1996 | Phillips et al. |
| 5,512,952 A | 4/1996 | Iwamura |
| 5,532,744 A | 7/1996 | Akiwumi-Assani et al. |
| 5,617,541 A | 4/1997 | Albanese et al. |
| 5,650,782 A | 7/1997 | Kim |
| 5,686,962 A | 11/1997 | Chung et al. |
| 5,708,473 A | 1/1998 | Mead |
| 5,731,840 A | 3/1998 | Kikuchi et al. |
| 5,761,423 A | 6/1998 | Lee |
| 5,767,909 A | 6/1998 | Jung |

(Continued)

FOREIGN PATENT DOCUMENTS

| | | | | |
|---|---|---|---|---|
| CN | 1741616 A | * | 3/2006 | ............... H04N 7/26 |
| CN | 101039430 A | * | 9/2007 | ............... H04N 7/26 |

(Continued)

OTHER PUBLICATIONS

Mozilla, "Introduction to Video Coding".

(Continued)

*Primary Examiner* — Dave Czekaj
*Assistant Examiner* — David N Werner
(74) *Attorney, Agent, or Firm* — Young Basile Hanlon & MacFarlane P.C.

(57) ABSTRACT

A system, method, and apparatus for encoding and decoding a video signal having at least one frame with a plurality of blocks are disclosed. The method disclosed includes, in one implementation, transforming coefficients in the plurality of blocks, quantizing the transformed coefficients, and ordering the quantized transform coefficients such that zero value coefficients and non-zero value coefficients are grouped together. The method also includes identifying at least one characteristic associated with at least one of the transform coefficients, an encoding process, or a quantization process, determining at least one threshold criteria for a segment, comparing the at least one threshold criteria for the segment with the at least one identified characteristic using a processor, and assigning the at least one block in the plurality of blocks to a segment based on the comparison.

25 Claims, 7 Drawing Sheets

(56) References Cited

U.S. PATENT DOCUMENTS

| | | |
|---|---|---|
| 5,777,680 A | 7/1998 | Kim |
| 5,818,536 A | 10/1998 | Morris et al. |
| 5,818,967 A | 10/1998 | Bhattacharjee et al. |
| 5,886,652 A | 3/1999 | Adachi et al. |
| 5,886,742 A | 3/1999 | Hibi et al. |
| 5,991,428 A | 11/1999 | Taniguchi |
| 5,991,447 A | 11/1999 | Eifrig et al. |
| 6,005,980 A | 12/1999 | Eifrig et al. |
| 6,075,875 A | 6/2000 | Gu |
| 6,104,751 A | 8/2000 | Artieri |
| 6,108,383 A | 8/2000 | Miller et al. |
| 6,125,144 A | 9/2000 | Matsumura et al. |
| 6,157,326 A | 12/2000 | Van Der Vleuten et al. |
| 6,173,012 B1 | 1/2001 | Katta et al. |
| 6,212,234 B1 | 4/2001 | Andoh et al. |
| 6,212,235 B1 | 4/2001 | Nieweglowski et al. |
| 6,222,174 B1 | 4/2001 | Tullis et al. |
| 6,256,423 B1 | 7/2001 | Krishnamurthy et al. |
| 6,272,179 B1 | 8/2001 | Kadono |
| 6,285,804 B1 | 9/2001 | Crinon et al. |
| 6,289,049 B1 | 9/2001 | Kim et al. |
| 6,292,837 B1 | 9/2001 | Miller et al. |
| 6,314,208 B1 | 11/2001 | Konstantinides et al. |
| 6,349,154 B1 | 2/2002 | Kleihorst |
| 6,359,929 B1 | 3/2002 | Boon |
| 6,381,277 B1 | 4/2002 | Chun et al. |
| 6,414,995 B2 | 7/2002 | Okumura et al. |
| 6,418,166 B1 | 7/2002 | Wu et al. |
| 6,434,197 B1 | 8/2002 | Wang et al. |
| 6,473,460 B1 | 10/2002 | Topper |
| 6,473,463 B2 | 10/2002 | Agarwal |
| 6,501,860 B1 | 12/2002 | Charrier et al. |
| 6,522,784 B1 | 2/2003 | Zlotnick |
| 6,538,698 B1 | 3/2003 | Anderson |
| 6,542,541 B1 | 4/2003 | Luna et al. |
| 6,570,924 B1 | 5/2003 | Lynch et al. |
| 6,574,273 B1 | 6/2003 | Luna et al. |
| 6,600,786 B1 | 7/2003 | Prakash et al. |
| 6,628,845 B1 | 9/2003 | Stone et al. |
| 6,650,704 B1 | 11/2003 | Carlson et al. |
| 6,654,418 B2 | 11/2003 | Haskell et al. |
| 6,661,842 B1 | 12/2003 | Abousleman |
| 6,661,925 B1 | 12/2003 | Pianykh et al. |
| 6,687,303 B1 | 2/2004 | Ishihara |
| 6,711,209 B1 | 3/2004 | Lainema et al. |
| 6,711,211 B1 | 3/2004 | Lainema |
| 6,735,249 B1 | 5/2004 | Karczewicz et al. |
| 6,775,326 B2 | 8/2004 | Sekiguchi et al. |
| 6,778,553 B1 | 8/2004 | Chou |
| 6,856,701 B2 | 2/2005 | Karczewicz et al. |
| 6,907,079 B2 | 6/2005 | Gomila et al. |
| 6,917,651 B1 | 7/2005 | Yoo et al. |
| 6,985,527 B2 | 1/2006 | Gunter et al. |
| 7,010,032 B1 | 3/2006 | Kikuchi et al. |
| 7,085,425 B2 | 8/2006 | Christopoulos et al. |
| 7,116,830 B2 | 10/2006 | Srinivasan |
| 7,116,831 B2 | 10/2006 | Mukerjee et al. |
| 7,173,968 B1 | 2/2007 | Kutka et al. |
| 7,184,482 B2 | 2/2007 | Prakash et al. |
| 7,218,674 B2 | 5/2007 | Kuo |
| 7,253,831 B2 | 8/2007 | Gu |
| 7,263,125 B2 | 8/2007 | Lainema |
| 7,266,150 B2 | 9/2007 | Demos |
| 7,432,329 B2 | 10/2008 | Haubennestel et al. |
| 7,672,377 B2 | 3/2010 | Heng et al. |
| 7,711,052 B2 | 5/2010 | Hannuksela et al. |
| 7,715,475 B1 | 5/2010 | Puri et al. |
| 7,773,670 B1 | 8/2010 | Puri et al. |
| 7,843,998 B2 | 11/2010 | Bjontegaard |
| 8,000,546 B2 | 8/2011 | Yang et al. |
| 8,064,527 B2 * | 11/2011 | Liu et al. .................. 375/240.27 |
| 8,116,373 B2 | 2/2012 | Base et al. |
| 8,503,528 B2 | 8/2013 | Grange et al. |
| 8,938,001 B1 | 1/2015 | Bankoski et al. |
| 2001/0022815 A1 | 9/2001 | Agarwal |
| 2002/0009153 A1 | 1/2002 | Jeon et al. |
| 2002/0026639 A1 | 2/2002 | Haneda |
| 2002/0031272 A1 | 3/2002 | Bagni et al. |
| 2002/0036705 A1 | 3/2002 | Lee et al. |
| 2002/0071485 A1 | 6/2002 | Caglar et al. |
| 2002/0080871 A1 | 6/2002 | Fallon et al. |
| 2002/0176502 A1 | 11/2002 | Rose et al. |
| 2002/0181790 A1 | 12/2002 | Nakata |
| 2003/0035484 A1 | 2/2003 | Prakash et al. |
| 2003/0081850 A1 | 5/2003 | Karczewicz et al. |
| 2003/0123545 A1 | 7/2003 | Prakash et al. |
| 2003/0128886 A1 * | 7/2003 | Said .................. H04N 19/129 382/248 |
| 2003/0138045 A1 | 7/2003 | Murdock et al. |
| 2003/0215018 A1 | 11/2003 | MacInnis et al. |
| 2003/0227972 A1 * | 12/2003 | Fukuda .................. 375/240.13 |
| 2004/0013308 A1 | 1/2004 | Jeon et al. |
| 2004/0120398 A1 | 6/2004 | Zhang et al. |
| 2004/0131117 A1 | 7/2004 | Sheraizin et al. |
| 2004/0151252 A1 | 8/2004 | Sekiguchi et al. |
| 2004/0156437 A1 | 8/2004 | Lainema |
| 2004/0234144 A1 | 11/2004 | Sugimoto et al. |
| 2005/0123207 A1 | 6/2005 | Marpe et al. |
| 2005/0152459 A1 | 7/2005 | Lobo et al. |
| 2005/0180500 A1 | 8/2005 | Chiang et al. |
| 2005/0201470 A1 * | 9/2005 | Sievers .................. 375/240.24 |
| 2005/0220352 A1 | 10/2005 | Wemelsfelder |
| 2005/0265447 A1 | 12/2005 | Park |
| 2005/0276323 A1 | 12/2005 | Martemyanov et al. |
| 2006/0001557 A1 | 1/2006 | Liao |
| 2006/0072664 A1 | 4/2006 | Kwon et al. |
| 2006/0093038 A1 | 5/2006 | Boyce |
| 2006/0098738 A1 | 5/2006 | Cosman et al. |
| 2006/0126724 A1 | 6/2006 | Cote et al. |
| 2006/0153304 A1 | 7/2006 | Prakash et al. |
| 2006/0203916 A1 | 9/2006 | Chandramouly et al. |
| 2006/0251330 A1 | 11/2006 | Toth et al. |
| 2006/0285589 A1 | 12/2006 | Hannuksela |
| 2007/0025441 A1 | 2/2007 | Ugur et al. |
| 2007/0127831 A1 | 6/2007 | Venkataraman |
| 2007/0136742 A1 | 6/2007 | Sparrell |
| 2007/0177673 A1 | 8/2007 | Yang |
| 2007/0217508 A1 | 9/2007 | Shimada et al. |
| 2007/0274385 A1 | 11/2007 | He |
| 2007/0274388 A1 | 11/2007 | Lee et al. |
| 2008/0013633 A1 * | 1/2008 | Ye .................. H04N 19/13 375/240.24 |
| 2008/0152007 A1 | 6/2008 | Sekiguchi et al. |
| 2008/0170615 A1 | 7/2008 | Sekiguchi et al. |
| 2008/0181299 A1 | 7/2008 | Tian et al. |
| 2008/0187053 A1 | 8/2008 | Zhao et al. |
| 2008/0310503 A1 | 12/2008 | Lee et al. |
| 2008/0310745 A1 * | 12/2008 | Ye .................. H04N 19/61 382/238 |
| 2009/0175332 A1 | 7/2009 | Karczewicz et al. |
| 2009/0190659 A1 | 7/2009 | Lee et al. |
| 2009/0196342 A1 | 8/2009 | Divorra Escoda et al. |
| 2010/0054328 A1 | 3/2010 | Nozawa |
| 2010/0061444 A1 | 3/2010 | Wilkins et al. |
| 2010/0074332 A1 | 3/2010 | Karczewicz et al. |
| 2010/0086028 A1 | 4/2010 | Tanizawa et al. |
| 2010/0097250 A1 | 4/2010 | Demircin et al. |
| 2010/0098169 A1 | 4/2010 | Budagavi |
| 2010/0118945 A1 | 5/2010 | Wada et al. |
| 2010/0128796 A1 | 5/2010 | Choudhury |
| 2010/0142761 A1 | 6/2010 | Venkatapuram et al. |
| 2010/0278234 A1 | 11/2010 | Jeong et al. |
| 2010/0290568 A1 | 11/2010 | Suzuki et al. |
| 2010/0329334 A1 | 12/2010 | Kim et al. |
| 2011/0007977 A1 | 1/2011 | Amonou et al. |
| 2011/0080946 A1 | 4/2011 | Li et al. |
| 2011/0235706 A1 | 9/2011 | Demircin et al. |
| 2011/0243225 A1 | 10/2011 | Min et al. |
| 2011/0249743 A1 | 10/2011 | Zhao et al. |
| 2011/0264676 A1 | 10/2011 | Belan et al. |
| 2012/0020408 A1 | 1/2012 | Chen et al. |
| 2012/0031969 A1 | 2/2012 | Hammad |
| 2012/0082220 A1 | 4/2012 | Mazurenko et al. |
| 2012/0140822 A1 | 6/2012 | Wang et al. |

(56) References Cited

U.S. PATENT DOCUMENTS

| | | | |
|---|---|---|---|
| 2012/0147948 | A1 | 6/2012 | Sole et al. |
| 2012/0183052 | A1 | 7/2012 | Lou et al. |
| 2012/0201475 | A1 | 8/2012 | Carmel et al. |
| 2012/0207222 | A1 | 8/2012 | Lou et al. |
| 2012/0236931 | A1 | 9/2012 | Karczewicz et al. |
| 2012/0243605 | A1 | 9/2012 | Turlikov et al. |
| 2012/0320978 | A1 | 12/2012 | Ameres et al. |
| 2012/0328026 | A1 | 12/2012 | Sole Rojals et al. |
| 2013/0003829 | A1 | 1/2013 | Misra et al. |
| 2014/0177708 | A1 | 6/2014 | Alshin et al. |

FOREIGN PATENT DOCUMENTS

| | | | | |
|---|---|---|---|---|
| CN | WO 2012119463 | A1 * | 9/2012 | ....... H04N 19/00775 |
| CN | EP 2677750 | A1 * | 12/2013 | ....... H04N 19/00775 |
| EP | 0634873 | | 1/1995 | |
| EP | 1351510 | | 10/2003 | |
| EP | 1768415 | | 3/2007 | |
| JP | 61092073 | | 5/1986 | |
| JP | 2217088 | | 8/1990 | |
| JP | 8280032 | | 10/1996 | |
| JP | 09247682 | | 9/1997 | |
| JP | 11262018 | | 9/1999 | |
| JP | 11289544 | | 10/1999 | |
| JP | 11313332 | | 11/1999 | |
| JP | 11513205 | | 11/1999 | |
| JP | 2002141806 | | 5/2002 | |
| JP | 2003046944 | | 2/2003 | |
| JP | 2003235044 | | 8/2003 | |
| KR | 100213018 | | 8/1999 | |
| WO | WO0150770 | | 7/2001 | |
| WO | WO02093488 | | 11/2002 | |
| WO | WO03026315 | | 3/2003 | |
| WO | WO2010149900 | | 12/2010 | |

OTHER PUBLICATIONS

Park, Jun Sung, et al., "Selective Intra Prediction Mode Decision for H.264/AVC Encoders", World Academy of Science, Engineering and Technology 13, (2006).

Cicconi et al., "Efficient Region-Based Motion Estimation and Symmetry Oriented Segmentation for Image Sequence Coding," IEEE Trans. On Circuits and Systems for Video Technology, vol. 4, No. 3, Jun. 1994, pp. 357-364.

Salembier et al., "Segmentation-Based Video Coding system Allowing the Manipulation of Objects," IEEE Trans. On Circuits and Systems for Video Technology, vol. 7, No. 1, Feb. 1997, pp. 60-74.

Wiegand, Thomas, Study of Final Committee Draft of Joint Video Specification (ITU-T Rec. H264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, an Open Source Video Codec for the Web". Dated Jul. 11, 2011.

Bankoski et al. "VP8 Data Format and Decoding Guide" Independent Submission. Dated Nov. 2011.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Chung R H Y et al. "Efficient Block-Based Motion Segmentation Method using Motion Vector Consistency"; Proceedings of the Ninth Conference on Machine Vision Application: Tsukuba Science City, Japan; May 16-18, 2005.

Collins, M., Schapire, Robert E. and Singer, Y. Logistic regression, adaboost and bregman distances. Machine Learning, 48(1-3):253-285, 2002.

Glaser-Garrett, Jason, "A novel macroblock-tree algorithm for high-performance optimization of dependent video coding in H.264/AVC", Department of Computer Science, Harvey Mudd College, Date Unknown, 12 pp.

Guillotel, Philippe, et al.; "Comparison of motion vector coding techniques", SPIE vol. 2308, 1994, 11 pp.

Han et al., "Toward Jointly Optimal Spatial Prediction and Adaptive Transform in Video/Image Coding," ICASSP 2010 (Dallas, TX, Mar. 14-19, 2010).

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Liu, Bede, et al.; "A simple method to segment motion field for video coding", SPIE vol. 1818, Visual Communications and Image Processing 1992, 10 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

Nicolas, H., et al.; "Region-based motion estimation using deterministic relaxation schemes for image sequence coding", IEEE 1992, 4 pp.

(56) References Cited

OTHER PUBLICATIONS

Nokia, Inc., Nokia Research Center, "MVC Decoder Description", Telecommunication Standardization Sector, Study Period 1997-2000, Geneva, Feb. 7, 2000, 99 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pp.

Wiegand, Thomas, et al.; "Long-Term Memory Motion-Compensated Prediction", Publication Unknown, Date Unknown, 15 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wright, R. Glenn, et al.; "Multimedia—Electronic Technical Manual for ATE", IEEE 1996, 3 pp.

Zhang, Kul, et al.; "Variable Block Size Video Coding With Motion Prediction and Motion Segmentation", SPIE vol. 2419, 1995, 9 pp.

Auyeung C. et al.:"parallel processing friendly simplified context selection of significance map", 4.JCT-VC Meeting; 95. MPEG Meeting; Jan. 20, 2011-Jan. 28, 2011; Daegu; (Joint Collaborative Team on Video Coding of IS/IEC JTC1/SC291 WG11 and ITU-T SG.16); URL:http://wftp3.itu.int/AV-ARCH/JCTVC-SITE/, No. JCTVC-D260, Jan. 16, 2011, all pages.

Canadian Office Action in CA2810899, related to U.S. Appl. No. 13/253,385, mailed Jan. 25, 2015.

Chenjie Tu et al., "Context-Based Entropy of Block Transform Coefficients for Image Compression" IEEE 11, No. 11, Nov. 1, 2002, pp. 1271-1283.

ISR & Written Opinion in Application # PCT/US2012/024608; mailed Jun. 5, 2012.

ISR and Written Opinion of the International Searching Authority, for Int'l Application No. PCT/US2012/020707; Feb. 15, 2012, 15 pages.

J-R Ohm, et al., "Report of the 4th JCT-VC Meeting", JCT-VC Meeting, Jan. 24, 2011.

Lou J, et al., "On Context Selection for Significant_Coeff_Flag Coding", 96. MPEG Meeting Mar. 21-Mar. 25, 2011.

Lou, Jian, et al., "Parallel Processing Friendly Context Modeling for Significance Map Coding in CABAC",4.JCT-VC Meeting; 95. MPEG Meeting; Jan. 20, 2011-Jan. 28, 2011; Daegu; (Joint Collaborative Team on Video Coding of IS/IEC JTC1/SC29/WG11 and ITU-T SG.16); URL:http://wftp3.itu.int/AV-ARCH/JCTVC-SITE/, No. JCTVC-D241, Jan. 19, 2011, all pages.

Marpe et al., Context-Based Adaptive Binary Arithmetic Coding in the H.264/AVC Video Compression Standard, Detlev marpe, IEEE Transactions on Circuits and Systems for Video Technology, vol. 13, No. 7, Jul. 2003, 17 pages.

Overview of th H.264/AVC Video Coding Standard, Thomas Wiegand, Gary J. Sullivan, Gisle Bjontegaard, and Ajay Luthra, IEEE Transactions on Circuits and Systems for Video Technology, p. 1-19, Jul. 2003.

Richardson, "H.264/MPEG-4 Part 10: Introduction to CABAC," Oct. 17, 2002.

Sole, et al., Parallel Context Processing for the significance map in high coding efficiency. Joel Sole, JCTVC_D262, ver 1, 2011-01016.

Sze V, et al.,"CE11: Simplified context selection for significan t_coeff_flag (JCTVC-C227)", JCT_VC Meeting, Jan. 15, 2011.

Vadim Seregin, et al., "Low-Complexity Adaptive Coefficients Scanning", Joint Collaborative Team on Video Coding (JCT-VC) of ITU-T SG16 WP3 and ISO/IEC JTC1/SC29 WG11, vol. JCTCV-C205, Oct. 2, 2010, all pages.

Winken (Fraunhofer HHI) M. et al., "Description of Video Coding Technology Proposal by Fraunhoffer HHI", 1. JCT-VC Meeting Apr. 15, 2010-Apr. 23, 2010; Dresden; (Joint Collaborative Team on Video Coding of IS/IEC JTC1/SC29/WG11 and ITU-T SG.16); JCTVC-A116, URL:http://wftp3.itu.int/AV-ARCH/JCTVC-SITE/, No. 24 Apr. 2010, all pages.

\* cited by examiner

SEGMENTATION BASED ENTROPY ENCODING AND DECODING

TECHNICAL FIELD

The present invention relates in general to encoding and decoding and in particular to entropy encoding and decoding of video.

BACKGROUND

Digital video streams typically represent video using a sequence of frames (i.e. still images). An increasing number of applications today make use of digital video stream encoding for purposes other than traditional moving pictures (such as movies and video clips). For example, screen capture and screen casting applications generally represent the output of a computer monitor over time as a digital video stream, irrespective of the specialized nature of the content of the monitor. Typically, screen capture and screen casting digital video streams are encoded using video encoding techniques like those used for traditional moving pictures. To permit transmission of digital video streams while limiting bandwidth consumption, a number of video compression schemes have been devised.

SUMMARY

Embodiments of systems, methods, and apparatuses for encoding and decoding a video signal are disclosed herein. One aspect of the disclosed embodiments is a method for encoding a video signal having at least one frame with a plurality of blocks containing one or more coefficients. The method includes transforming the coefficients in the plurality of blocks and quantizing at least some of the transformed coefficients to generate zero value quantized coefficients and non-zero value quantized coefficients. The quantized transform coefficients are ordered in at least one of the plurality of blocks such that at least some zero value quantized coefficients are grouped together. At least one entropy-related characteristic, associated with the at least one block, is identified. The at least one block is assigned to the segment based on the at least one identified entropy-related characteristic. The at least one block is encoded.

Another aspect of the disclosed embodiments is a method for encoding a video signal having at least one frame with a plurality of blocks, wherein the method includes identifying at least one characteristic associated with at least one of the plurality of blocks, an encoding process, or a quantization process, transforming coefficients in the plurality of blocks, quantizing the transformed coefficients and ordering the quantized transform coefficients such that zero value coefficients and non-zero value coefficients are grouped together. The method also includes determining at least one threshold criteria for a segment, comparing the at least one threshold criteria for the segment with the at least one identified characteristic associated with at least one of the plurality of blocks using a processor and assigning the at least one block in the plurality of blocks to a segment based on the comparison. The at least one block is then encoded.

Another aspect of the disclosed embodiment is an apparatus for encoding a video signal having at least one frame with a plurality of blocks. The apparatus includes a memory and a processor in communication with the memory. The processor is configured to execute instructions stored in the memory. The instructions permit the processor to transform the coefficients in the plurality of blocks and quantize at least some of the transformed coefficients to generate zero value quantized coefficients and non-zero value quantized coefficients. The processor orders the quantized transform coefficients in at least one of the plurality of blocks such that at least some zero value quantized coefficients are grouped together. The processor identifies at least one entropy-related characteristic associated with the at least one block. The processor assigns the at least one block to a segment based on the at least one identified entropy-related characteristic. The processor encodes the at least one block.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

Digital video streams can include formats such as VP8 and other VPx codecs, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

In encoding systems, data from the digital video stream is separated into frames and further separated into blocks of data in each frame. In some cases, data in these blocks are ordered such that non-zero value data and zero value data are grouped together. For some encoders such as some encoders using VP8 data format, each block within a frame contains a special end of block (EOB) token that indicates when the group of zero value data begins or when the final non-zero data occurs. This EOB data can be sent in the data stream to a decoder. While sending the EOB data may be cheaper than encoding a run of zero values for each block, there is still a cost incurred for almost every block which may account for a significant number of bits for each encoded frame. A system and method capable of reducing the amount of overhead data including EOB data can result in significant gains in compression efficiency.

Figure 1:
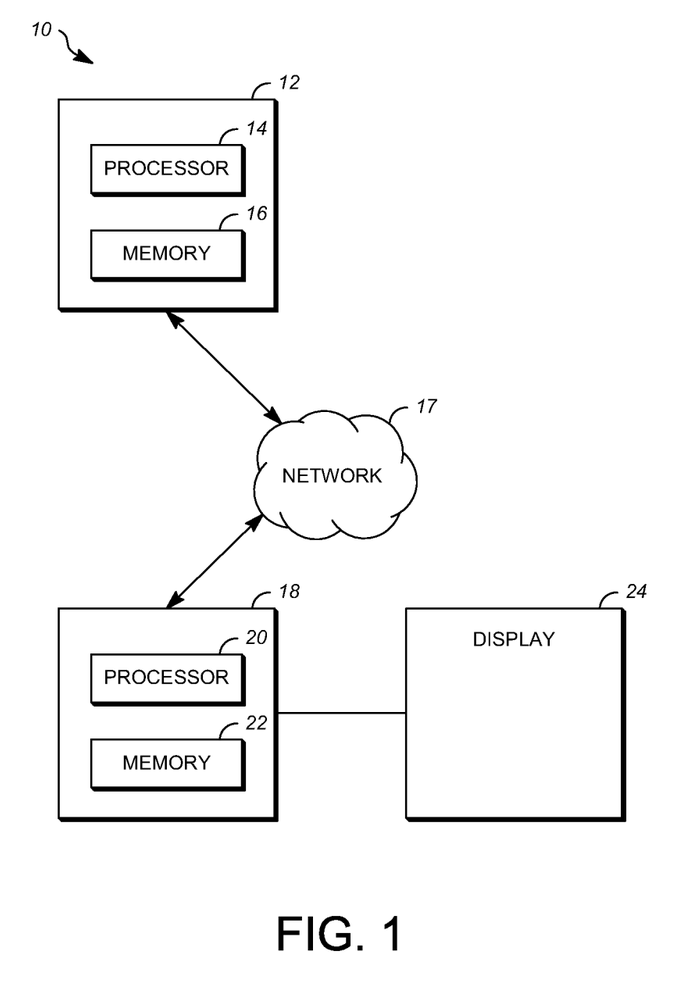
FIG. 1 is a schematic of a video encoding and decoding system.

FIG. 1 is a schematic of a video encoder and decoder system 10 for still or dynamic video images. An exemplary transmitting station 12 can be, for example, a computer having an internal configuration of hardware including a processor such as a processor 14. In this example, processor 14 is a central processing unit. Processor 14 controls the operations of the transmitting station 12. The processor 14 is connected to the memory 16 by, for example, a memory bus. The memory 16 can be random access memory (RAM) or any other suitable memory device. The memory 16 can store data and program instructions which are used by the processor 14. Other suitable implementations of transmitting station 12 are possible.

A network 17 connects the transmitting station 12 and a receiving station 18 for encoding and decoding of the video stream. Specifically, the video stream can be encoded in the transmitting station 12 and the encoded video stream can be decoded in the receiving station 18. The network 17 can, for example, be the Internet. The network 17 can also be a local area network (LAN), wide area network (WAN), virtual private network (VPN), or any other means of transferring the video stream from transmitting station 12.

The receiving station 18, in one example, may be a computer having an internal configuration of hardware including a processor such as a processor 20, which in this case is a central processing unit, and a memory 22. The processor 20 controls the operations of the receiving station 18. The processor 20 can be connected to the memory 22 by, for example, a memory bus. The memory 22 may be RAM or any other suitable memory device. The memory 22 stores data and program instructions which are used by the processor 20. Other suitable implementations of the receiving station 18 are possible.

A display 24 configured to display a video stream can be connected to the receiving station 18. The display 24 can be implemented in various ways, including with a liquid crystal display (LCD) or a cathode-ray tube (CRT). The display 24 can be configured to display a video stream decoded at the receiving station 18.

Other implementations of the encoder and decoder system 10 are possible. For example, one implementation can omit the network 17 and/or the display 24. In another implementation, a video stream can be encoded and then stored for transmission at a later time by the transmitting station 12 or any other device having memory. In another implementation, additional components may be added to the encoder and decoder system 10. For example, a display or a video camera may be attached to transmitting station 12 to capture the video stream to be encoded. In one implementation, receiving station 18 includes display 24. Although processors 14 and 20 are illustrated by single central processing units, the term "processor" encompasses a system with a single processing unit, a system with multiple processing units, and multiple systems with one or more processing units operating in parallel or otherwise to implement the disclosed embodiments. Although memories 16 and 22 are shown as single units, the term "memory" encompasses memory (including different kinds of memory) physically distributed across multiple units as appropriate, including for example the RAM used in connection with processors preforming the disclosed embodiments in parallel and network-based storage.

Figure 2:
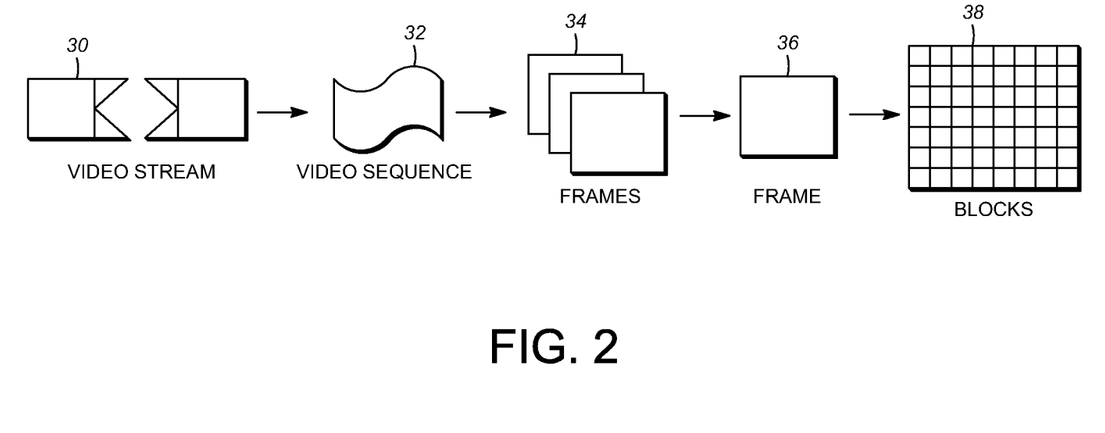
FIG. 2 is a diagram of a typical video stream to be encoded and decoded.

FIG. 2 is a diagram a typical video stream 30 to be encoded and decoded. Video coding formats, such as VP8 or H.264, provide a defined hierarchy of layers for the video stream 30. The video stream 30 includes a video sequence 32. At the next level, the video sequence 32 includes a number of adjacent frames 34. While three frames are depicted as the adjacent frames 34, the video sequence 32 can include any number of adjacent frames. At the next level, the adjacent frames 34 can be further analyzed as individual frames, e.g., a single frame 36. At the next level, the single frame 36 can be divided into a series of blocks 38, which can contain data corresponding to, for example, a 16×16 pixel group of displayed pixels in the frame 36. Each block 38 can contain luminance and chrominance data for the corresponding pixels. The blocks 38 can also be of any other suitable size such as 16×8 pixel groups, 8×16 pixel groups, or 4×4 pixel groups.

Figure 3:
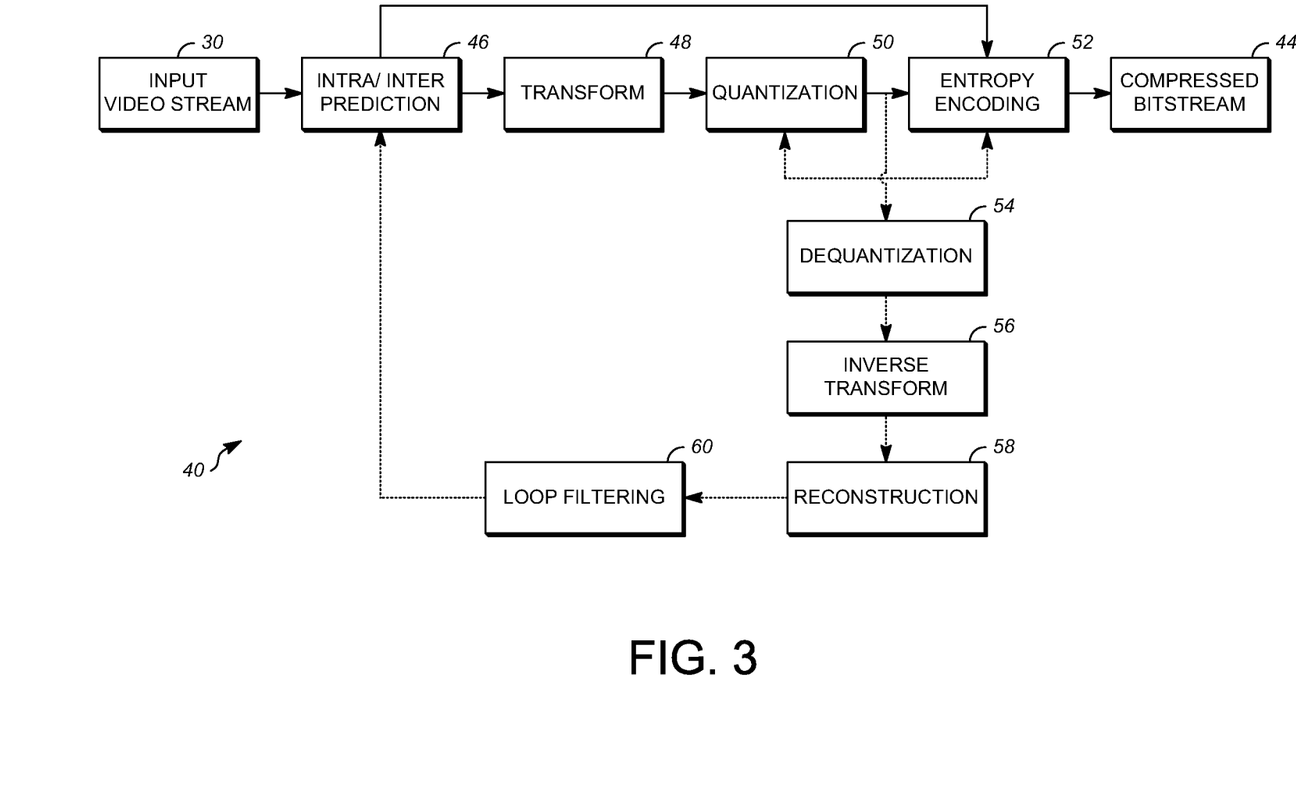
FIG. 3 is a block diagram of a video compression system in accordance with one embodiment.

FIG. 3 is a block diagram of an encoder 40 in accordance with one exemplary embodiment. In one exemplary embodiment, encoder 40 is implemented as software resident in memory 16 of transmitting station 12. The software is executed by processor 14 to perform the operation of encoder 40 as described below. Encoder 40 encodes an input video stream 30, and can be implemented, as described above, in the transmitting station 12. The encoder 40 has the following stages to perform the various functions in a forward path (shown by the solid connection lines) to produce an encoded or a compressed bitstream 44: an intra/inter prediction stage 46, a transform stage 48, a quantization stage 50, and an entropy encoding stage 52. The entropy encoding stage 52 may also provide feedback to the quantization stage 50 to alter quantization or to provide updates to a segmentation map. The encoder 40 also includes a reconstruction path (shown by the dotted connection lines) to reconstruct a frame for encoding of further blocks. The encoder 40 has the following stages to perform the various functions in the reconstruction path: a dequantization stage 54, an inverse transform stage 56, a reconstruction stage 58, and a loop filtering stage 60. Other structural variations of encoder 40 can be used to encode input video stream 30.

When the input video stream 30 is presented for encoding, each frame 36 within input video stream 30 is processed in units of blocks. At intra/inter prediction stage 46, each block can be encoded using either intra-frame prediction (i.e., within a single frame) or inter-frame prediction (i.e. from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at the intra/inter prediction stage 46 to produce a residual block (residual). The transform stage 48 transforms the residual into transform coefficients in, for example, the frequency domain. Examples of block-based transforms include the Karhunen-Loève Transform (KLT), the Discrete Cosine Transform ("DCT"), and the Singular Value Decomposition Transform ("SVD"). In one example, the DCT transforms the block into the frequency domain. In the case of DCT, the transform coefficient values are based on spatial frequency, with the lowest frequency (i.e. DC) coefficient at the top-left of the matrix and the highest frequency coefficient at the bottom-right of the matrix.

The quantization stage 50 converts the transform coefficients into discrete quantum values, which are referred to as quantized transform coefficients or quantization levels. The quantized transform coefficients are then entropy encoded by the entropy encoding stage 52. The entropy-encoded coefficients, together with the information required to decode the block, such as the type of prediction used, motion vectors, and quantizer value, are then output to the compressed bitstream 44. The compressed bitstream 44 can be formatted using various techniques, such as run-length encoding (RLE) and zero-run coding.

In one exemplary embodiment, the reconstruction path in FIG. 3 (shown by the dotted connection lines) can be used to ensure that both the encoder 40 and a decoder 62 (described below with reference to FIG. 4) use the same reference frames to decode the compressed bitstream 44. The reconstruction path performs functions that are similar to functions that take place during the decoding process that are discussed in more detail below, including dequantizing the quantized transform coefficients at the dequantization stage 54 and inverse transforming the dequantized transform coefficients at an the inverse transform stage 56 in order to produce a derivative residual block (derivative residual). At the reconstruction stage 58, the prediction block that was predicted at the intra/inter prediction stage 46 can be added to the derivative residual to create a reconstructed block. The loop filtering stage 60 can be applied to the reconstructed block to reduce distortion such as blocking artifacts.

Other variations of the encoder 40 can be used to encode compressed bitstream 44. For example, a non-transform based encoder 40 can quantize the residual signal directly without the transform stage 48.

The encoding process shown in FIG. 3 can also include two iterations or "passes" of processing the video data. The first pass can be carried out by the encoder 40 using an encoding process that is less computationally intensive which gathers and stores information about the input video stream 30 for use in the second pass. In the second pass, represented as the solid line between the intra/inter prediction stage 46 and the entropy encoding stage 52, the encoder 40 uses this information to optimize a later encoding, the final output of which may be the compressed bitstream 44. For example, the encoder 40 may use this information to select parameters for encoding, locating key-frames, selecting coding modes used to encode blocks 38, and allocating the number of bits to each frame 36. Parameters for encoding such as coding modes, including prediction modes, can also be stored in the memory 16 and used to select a zero bin at the quantization stage 50. The zero bin in some cases is a range of quantized coefficient values (e.g., −0.5 to +0.5) that will be rounded to zero prior to entropy encoding.

Figure 4:
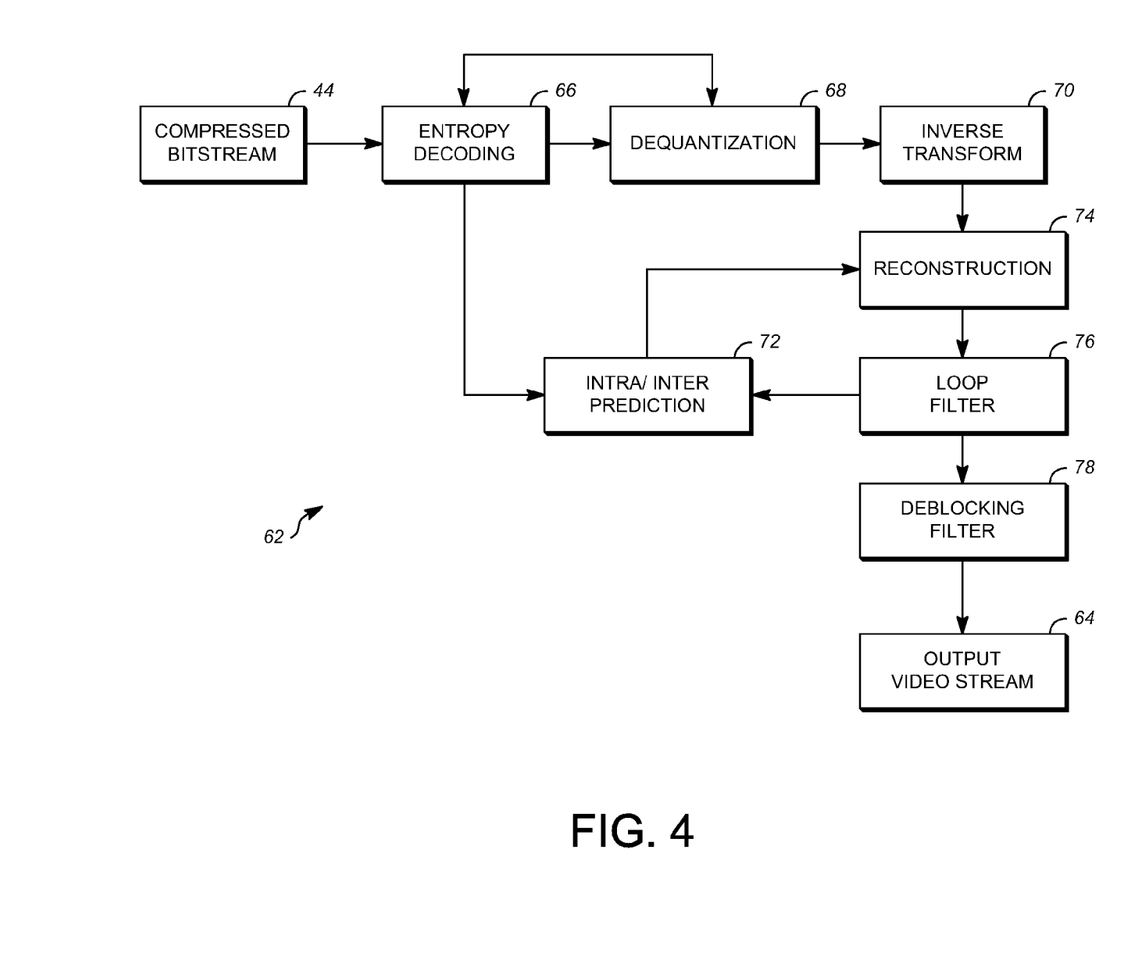
FIG. 4 is a block diagram of a video decompression system in accordance with another embodiment.

FIG. 4 is a block diagram of a decoder 62 in accordance with another embodiment. The decoder 62 decodes a compressed bitstream 44 and can be implemented, as described above, in the receiving station 18. In one exemplary embodiment, decoder 62 is implemented as software resident in memory 22 of receiving station 18. The software is executed by processor 20 to perform the operation of decoder 62 as described below. The decoder 62 operates in a manner similar to the reconstruction path of the encoder 40 discussed above. In one exemplary embodiment, decoder 62 includes the following stages to perform various functions to produce an output video stream 64 from the compressed bitstream 44: an entropy decoding stage 66, a dequantization stage 68, an inverse transform stage 70, an intra/inter prediction stage 72, a reconstruction stage 74, a loop filter stage 76, and a deblocking filter stage 78. Other structural variations of decoder 62 can be used to decode the compressed bitstream 44.

When the compressed bitstream 44 is presented for decoding, the data elements within the compressed bitstream 44 can be decoded by the entropy decoding stage 66 (using, for example, Context Adaptive Binary Arithmetic Decoding) to produce a set of quantized transform coefficients. The dequantization stage 68 dequantizes the quantized transform coefficients, and the inverse transform stage 70 inverse transforms the dequantized transform coefficients to produce a derivative residual that can be identical to that created by the reconstruction stage 58 in the encoder 40. Using header information decoded from the compressed bitstream 44, the decoder 62 can use the intra/inter prediction stage 72 to create the same prediction block as was created in the encoder 40. At the reconstruction stage 74, the prediction block can be added to the derivative residual to create a reconstructed block. The loop filter stage 76 can be applied to the reconstructed block to reduce blocking artifacts. The deblocking filter stage 78 can be applied to the reconstructed block to reduce blocking distortion, and the result is output as the output video stream 64.

Other variations of decoder 62 can be used to decode the compressed bitstream 44. For example, the decoder 62 can produce the output video stream 64 without the deblocking filter stage 78.

Figure 5:
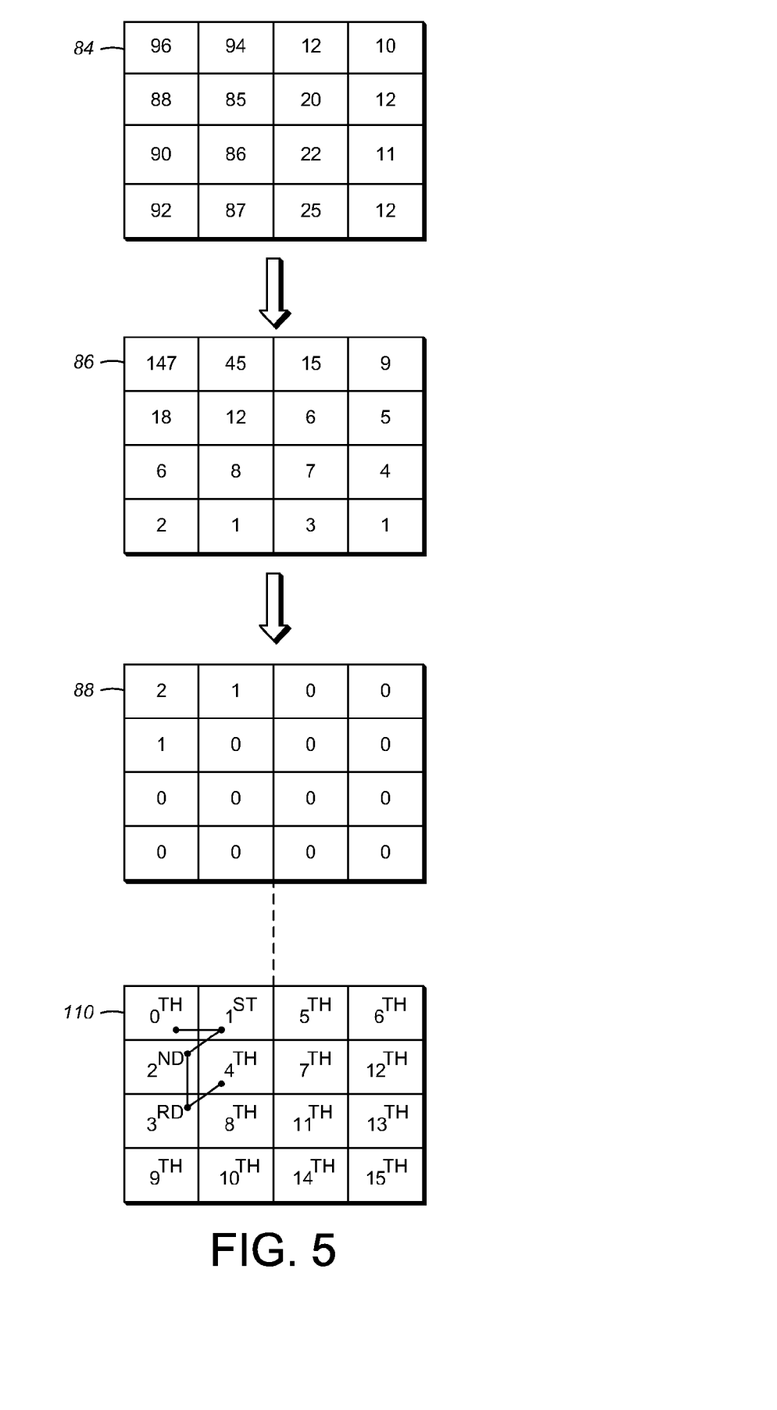
FIG. 5 is a schematic diagram of matrices of pixel data undergoing a method of carrying out a transform and quantization process in accordance with one embodiment of this disclosure.

FIG. 5 is a schematic diagram of matrices of image data. The matrices are shown in 4×4 blocks as an example. Other block sizes, such as 8×8 or 16×16, are also possible. In the example shown in FIG. 5, matrix 84 is a 4×4 block of image sample data, such as luminosity or residual values after prediction. Matrix 84 is in this case the block of residual values obtained by subtracting a block of predicted values from a block of actual values as found in the input video stream 30. Matrix 86 is an example 4×4 block of coefficients calculated by taking an arbitrary transform of matrix 84. In practice, the transform can be performed using, for example, a DCT that transforms the image data found in matrix 84 into the frequency domain. In this example, matrix 86 could be the output of the transform stage 48 in the encoder 40. The quantization stage 50 can remove the less visually significant high frequency data by dividing the coefficients in matrix 86 by an integer value. The results of quantization stage 50 are shown in matrix 88. Because the quantization stage 50 removes coefficients with insignificant magnitudes, the image data contained in matrix 88 can be represented with a reduced number of coefficient values in one form of lossy compression.

After the quantization stage 50, the transform coefficients may be re-ordered to group non-zero value coefficients together according to some aspects of a method in accordance with embodiments of this disclosure. An example scan order of the quantized coefficients of matrix 88 is shown in matrix 110. The values of the quantized coefficients have been substituted with ordinal numbers showing each coefficient's place in the scan order. The optimum re-ordering path or scan order depends on the distribution of non-zero transform coefficients. In this case, the reordering path or scan order shown in matrix 110 in FIG. 5 is a zig-zag order starting from the top left coefficient, labeled "$0^{th}$," and ending at the block labeled "15th." Because the DCT transform process typically places higher magnitude coefficients in the upper left region and low magnitude or zero value coefficients in the lower right region, the output of this re-ordering process many times will result in an array of data values with a series of mostly non-zero coefficients at the start and a series of zero coefficients at the end so that some patterns are more easily recognizable for the entropy encoding stage 52. Separating the zero and non-zero coefficients allows the array of data to be represented in a more compact manner. For example, the array may be represented as a series of (run, level) pairs where run indicates the number of zeros preceding a nonzero coefficient and level indicates the magnitude of a nonzero coefficient.

After the re-ordering process, the scanned coefficient values may be sent for entropy encoding at entropy encoding stage 52. Referring again to FIG. 3, the entropy encoding stage 52 may use any number of entropy encoders including Huffman coding, arithmetic coding or context adaptive variable width coding, for example. In general, entropy encoders represent common or frequently used characters with fewer bits and represent uncommon characters with more bits, resulting in fewer bits used in total.

For example, using the coefficients contained in matrix 88 after being re-ordered in the scan order as shown in matrix 110, the array of values would be [2, 1, 1, 0, 0, 0, 0, 0, 0, 0, 0, 0, 0, 0, 0, 0]. After encoding, the data can be represented as 2,1,1, EOB. The EOB indicator tells the encoder that after the second 1 value, the remaining coefficients in the block are zero. In this way, the number of bytes needed to represent the data array can be reduced from 16 bytes to a smaller number of bytes.

In some cases, an EOB flag or indicator is used to indicate the occurrence of the last non-zero coefficient in a block. The EOB indicator permits the entropy encoding stage 52 to treat the coefficients following the EOB indicator as zero valued coefficients without using bits to represent zeros occurring after the EOB indicator.

Another example form of encoding, three-dimensional run-level encoding, can be used where each symbol encodes three quantities: run, level, and last. Last can indicate whether the level is the last non-zero value in the linear array. In an example of three-dimensional run-level encoding, the re-ordered array of values in matrix 110 could be represented as (0, 2, 0), (0, 1, 0), (0, 1, 1). Here, the 1 after the final run, level acts as an EOB indicator or flag that indicates that the final run, level is the last nonzero coefficient in the array of data for that particular block of data.

In one aspect of a disclosed embodiment, many blocks within a frame 36 will use an EOB indicator to indicate the position of the last non-zero quantized transform coefficient. In such embodiments, an EOB indicator is typically not necessary when the last quantized transform coefficient in a block is non-zero. Because of the nature of DCT transforms and quantization, this case rarely occurs except at very high data rates or quality levels. Accordingly, in most applications, because each block in a number of blocks 38 contained in a frame 36 typically uses an EOB indicator, EOB indicators can add a significant amount of data to a compression scheme thereby reducing the effectiveness of compression.

In accordance with one aspect of the disclosed embodiments, the encoder 40 assigns blocks 38 into segments according to at least one characteristic, which can be an entropy-related characteristic, such as for example, the position of the EOB indicator within an array of transformed and quantized data or the number of nonzero values occurring prior the EOB indicator. By "entropy-related" it is meant a characteristic of the quantized coefficients (including without limitation, the quantizing process used to generate the quantized coefficients or the underlying data represented in the coefficients) whose value or manipulation affects the coding efficiency of entropy encoding or other lossless encoding of those coefficients. The term coding efficiency includes the level of compression achieved, the processing efficiency of the encoding, or other metrics associated with the entropy or other lossless encoding scheme. The encoder 40 may also select segments according to any other characteristic associated with transform coefficients, the encoding process, or the quantization process. The segments may also be selected from several of these characteristics. Furthermore, these several characteristics may all be inputs for an algorithm executed in the memory 16 that provides an output used to determine a segmentation map.

In a simple example for illustrative purposes, the characteristic may only be the position of the EOB indicator. Referring again to FIG. 5 and to matrix 88 and the scan order shown in matrix 110, if the encoding scheme described above is implemented, the EOB indicator could be in a fourth position: 2, 1, 1, EOB. For clarity, the "end-of-block" position in this example is the position immediately following the last non-zero coefficient (except in the rare instance when the last non-zero coefficient is the last coefficient of the block, in which case the block has no end-of-block position). Assigning blocks with the same EOB position to the same segment allows the encoder 40 to automatically code all blocks in the segment with the assumption that each block in the segment has an EOB of four, for example. With this segmentation, blocks no longer need include the overhead of an EOB indicator. If a particular segment contains 50 blocks of data, and an EOB indicator is one bit of data, the EOB position for all blocks assigned to that segment can be communicated in fewer bits of data than if each block was required to include an EOB indicator.

Alternatively, a group of blocks can be assigned to a segment that indicates that the end-of-block is at a default position (such as four, for example). In such an embodiment, not every block within that segment may have an end-of-block at position four; some blocks may have an end-of-block at position two or three, for example. Thus, there may be a range of positions at which blocks within a segment end. In such cases, while the segment specifies the default end-of-block position, specific blocks assigned to the segment can include an EOB indicator in a lower position. Note that while a range of EOB positions within a block can be implemented (at the cost of having to include EOB indicators in blocks whose end-of-block position is short of the segment default), better performance can be achieved if all of the blocks in the segment have an end-of-block position that is no higher than the default end-of-block position specified by the segment. One reason why blocks within a segment may have different end-of-block positions is that the segment may be based on additional parameters besides end-of-block location. Therefore, it may be cost-effective to include blocks sharing one or more of those additional parameters within the segment, even though in regard to the end-of-block location additional coding in the form of EOB indicators is used for those blocks whose end-of-block position falls short of the segment default.

In some embodiments, as discussed above, the end-of-block location specified at the segment level can be a position in the scan order (such as the fourth position). Alternatively, the end-of-block condition can be specified at the segment level by indicating the number of non-zero coefficients in each block. The grouping process (see FIG. 5 and accompanying description) does not necessarily result in all non-zero coefficients followed by all zero coefficients. Rather, the grouping process may group coefficients so that initial coefficients are primarily (but not exclusive) non-zero coefficients and later coefficients are primarily (but not exclusively) zero coefficients. For example, typical coefficients could be 5,2,0, 2,2,0,2,1,0,0, where zero and non-zero coefficients are interspersed. It is possible therefore to segment blocks by the number of non-zero coefficients, in which case blocks within the segment will likely have end-of-block positions falling within a range of end-of-block positions. In that case, in one implementation, the encoder counts the number of non-zero coefficients and determines that an end-of-block condition exists when the $n^{th}$ non-zero coefficient is encountered, where n is the number of non-zero coefficients specified at the segment level.

Figure 6:
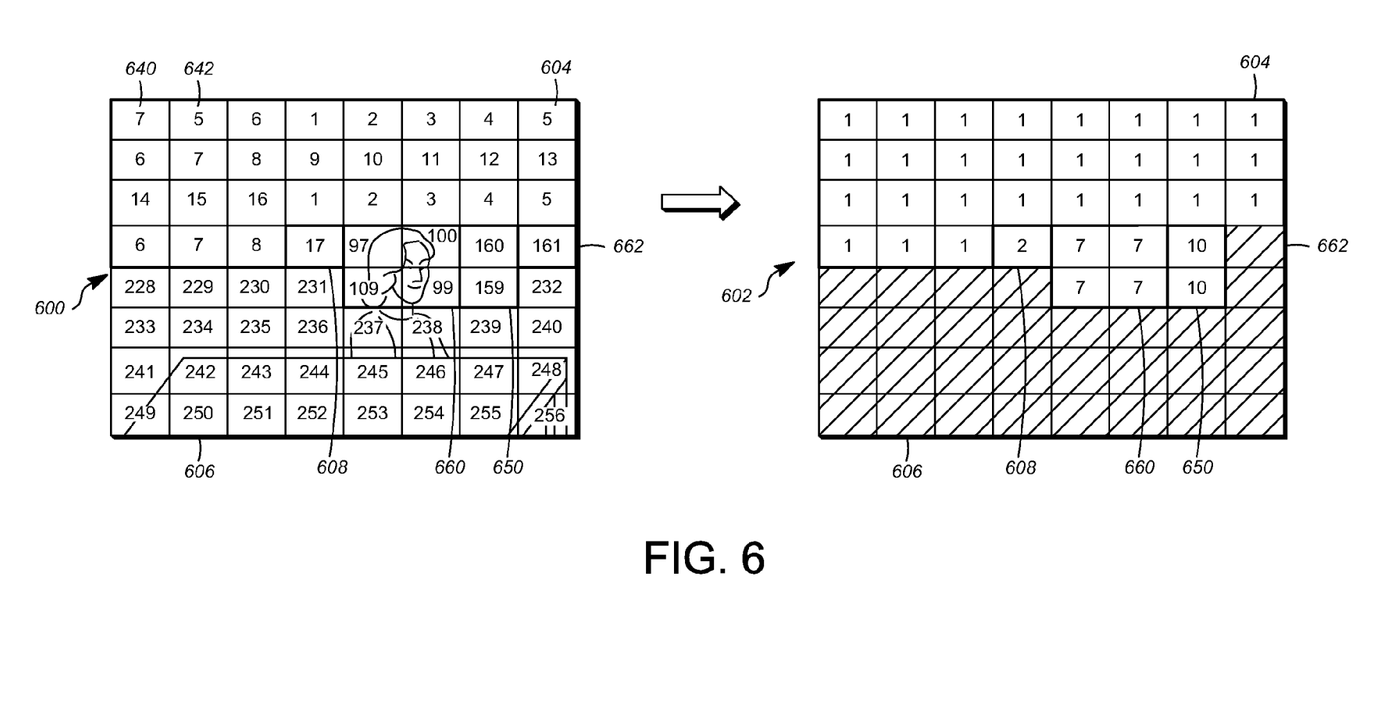
FIG. 6 is a schematic diagram of a frame of blocks of data assigned to various segments and a resulting segmentation map.

FIG. 6 shows a single frame 600 divided into blocks of data. The frame 600 could, for example, come from a video sequence of frames and be divided into blocks of pixel data as represented by the integers within the blocks of the example frame 600.

Figure 7:
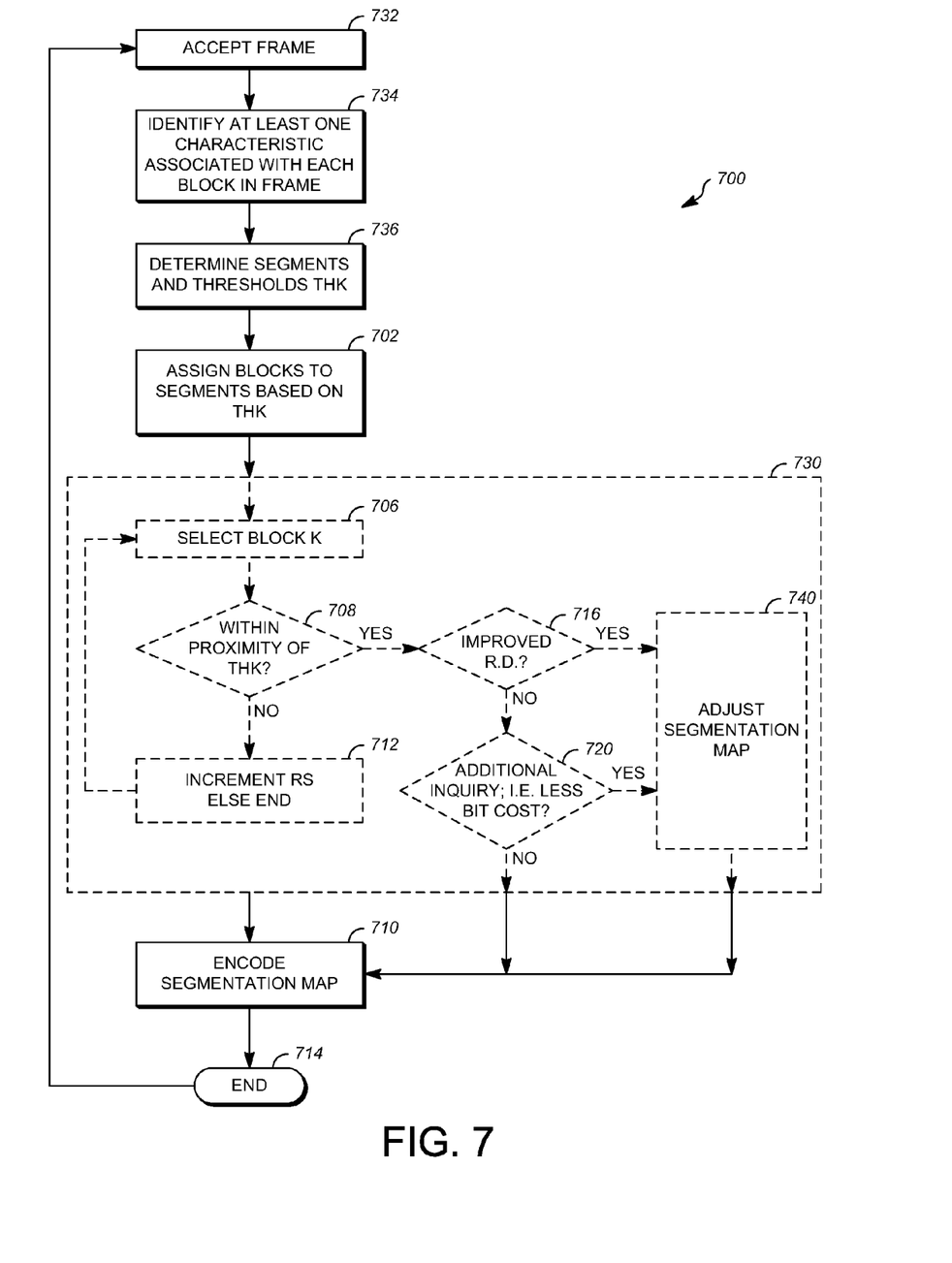
FIG. 7 is a flow chart of a method of segmenting blocks of data in accordance with embodiments of this disclosure.

FIG. 7 depicts an exemplary process 700 of segmenting a frame, such as frame 600, based on at least one characteristic such as an EOB indicator. Each time a new frame has been transformed at the transformation stage 48 and quantized at the quantization stage 50, the encoder 40 can accept the new frame at step 732 and analyze the frame of quantized transform coefficients to identify at least one characteristic associated with each block in the frame at step 734. The characteristic can be, for example, the position of the EOB indicator. The characteristic could also be other block characteristics such as quantizer level, motion vector data, block position with a frame, or transform coefficient data such as spatial frequency data or amplitude data. Once the at least one characteristic for segmentation is established at step 734, segments may be broken up by threshold values represented by $Th_k$, such that portions of a frame, such as the frame 600 shown in FIG. 6, can be divided into k segments where k can be any integer. A block could be identified and assigned to a segment with a single characteristic or could be identified and assigned to a segment based on several characteristics. Based on a comparison of the identified characteristic or characteristics with the threshold values $Th_k$, step 702 assigns blocks to various segments.

For example, if each block in frame 600 contained a 4×4 matrix of coefficients such as matrix 84, the EOB indicator could be one of 16 values as shown in matrix 110. Accordingly, if the characteristic to be identified at step 734 is the position of the EOB indicator for each block, a given frame could assign each block to one of 16 segments according to an EOB threshold criteria for each segment such that a first segment, segment 1, could have a threshold $Th_1$, a second segment, segment 2, could have a threshold $Th_2$ and so on up to a sixteenth segment, segment 16, with a threshold of $Th_{16}$. The threshold criteria for each segment can be determined through a process determined by a set of instructions stored in the memory 16 and executed in the processor 14. In this aspect of a disclosed embodiment, each block will be assigned to a segment at step 702. Alternatively, the encoder 40 may limit the number of possible segments to a subset of 16 segments such that some blocks remain unassigned to a segment.

Referring again to FIG. 6, a segmentation map 602 shows blocks from frame 600 being assigned to segments in accordance with embodiments described herein. Some blocks are not assigned to segments, such as blocks 606 and 662, such that those blocks do not contain any segmentation designation on the segmentation map 602.

Step 702 may cycle through all blocks in a frame in any predetermined order and compare each block in the frame with a first segment threshold $Th_1$. For example, referring again to FIG. 6, the EOB position of a first block 640 in frame 600 can be compared with first threshold $Th_1$ for a first segment that contains blocks with an EOB position of 1. If first block 640 has an EOB at the first scan position, for example the 0th position shown in matrix 110, then block 640 can be assigned to the first segment, segment 1. If block 640 has an EOB at a different position, for example, the 11th position, block 640 can remain unassigned and the next block in a predetermined scan cycle order can be compared against $Th_1$, e.g. block 642. In one implementation, step 702 may repeat this process for 16 separate threshold values before continuing to step 730 or alternatively to step 710. Steps 730 and 710 are further described below.

Alternatively, step 702 may assign each block to a segment based on a threshold comparison before cycling to the next block. For example, block 640 may be compared against each of the 16 thresholds and be assigned to a segment prior to cycling to the next block, e.g. block 642. Step 702 may also use any other process capable of assigning blocks to segments based on at least one identified characteristic. For example, segments may be defined by an algorithm applied at the encoder 40 and decoder 62 or by segmentation of previously encoded frames. Furthermore, segmentation maps such as segmentation map 602 may persist from frame to frame with real time updates based on entropy encoding information fed back from the entropy encoding stage 52 as shown in FIG. 3 rather than creating an entirely new segmentation map such as segmentation map 602 at step 702 for each frame.

In a second aspect of a disclosed embodiment, blocks may not contain a 4×4 set of quantized transform coefficients as in the first embodiment and as shown in matrix 88. Rather, blocks may have a 16×16 set of coefficients such that each block contains 256 coefficients. Here, having a segment and threshold $Th_k$ for each possible EOB position may cause process 700 as shown in FIG. 7 to be computationally inefficient. Accordingly, each segment may contain multiple EOB positions. For example, if each block has 256 possible EOB positions, a first segment may include any block that has an EOB position from 1-16 while a second segment may include any block that has an EOB position from 16-32, and so on for all 256 positions.

Alternatively, some EOB coefficient positions may rarely be occupied, such as positions 160-256, for example. Accordingly, only a subset of the possible EOB coefficient positions may be assigned to a segment. In one exemplary embodiment, shown in FIG. 6 by the segmentation map 602, only ten segments covering positions 1-160 are implemented. The EOB positions for each block are shown in frame 600 before segmentation. In this exemplary embodiment, blocks with EOB positions 161-256 may be left unassigned to a segment, e.g. as is shown in block 606. For blocks with EOB positions 161-256, such as 606, each block may be individually encoded with an EOB indicator ranging from 161-256 at the entropy encoding stage 52.

Referring again to FIG. 7, once a segmentation map 602 has been defined for a given frame at step 702, the segmentation map 602 may be sent to the entropy encoding stage 52 at step 710. One advantage of encoding a frame of image data according to a segmentation map is that for a large segment such as segment 1 covering EOB positions 1-16 and including block 604, a large number of data blocks can be encoded without having to encode an EOB indicator for each block. Rather, for a given segment with n blocks, if an EOB indicator is one bit, for example, then n−1 bits of transmission data can be saved by the segmentation technique according to one aspect of a disclosed embodiment because only one EOB indicator per segment is required.

As indicated by dashed lines in FIG. 7, step 730 is optional in the process 700. If step 730 is not included in the process 700, once a segmentation determination for all blocks in a given frame is made in step 702 to create a segmentation map, the frame is encoded at the entropy encoding stage 52 according to step 710. Once all segments are encoded for a given frame, the process 700 ends at step 714 and a new frame is accepted at step 732. However, optional step 730 may be implemented in the process 700 to dynamically adjust the segmentation map 602 according to any factor, including characteristics related to transform coefficients, the encoding process, or the quantization process. Step 730 may also be used to perform testing on a segmentation map determined at step 702 to discern a cost/quality metric for the determined segmentation map.

Specifically, step 706 within step 730 may select individual blocks in a frame such as frame 600 in FIG. 6 or a subset of blocks in the frame 600 such as blocks that have not yet been assigned to a segment in step 702, e.g. block 606. In either case, once a particular number of blocks has been selected at step 706, step 708 determines if that block is within a predetermined proximity of a given segment threshold $Th_k$. For example, referring again to FIG. 6, segment 1 has a segment threshold $Th_k$ of 16 and contains all blocks with an EOB indicator in coefficient positions 1-16, including block 604. Segment 2 has a segment threshold $Th_k$ of 32 and contains all blocks with an EOB indicator in coefficient positions 17-32, including block 608. Segment 7 has a segment threshold $Th_k$ of 112 and contains all blocks with an EOB indicator in coefficient positions 97-112, including block 660. Finally, segment 10 has a segment threshold $Th_k$ of 160 and contains all blocks with an EOB indicator in coefficient positions 145-160, including block 650. In the embodiment shown in FIG. 6 and segmentation map 602 there are only ten possible segments. Here, blocks with an EOB indicator greater than 160 are not assigned to a segment at step 702, including block 606.

Referring to step 708 within step 730, the proximity may be a dynamically determined or predetermined number. For example, if the predetermined proximity at step 708 is 2, block 662 with an EOB indicator position of 161 will be indicated as a block that is within a predetermined proximity of block 650 and hence be included in segment 10. In one aspect of a disclosed embodiment, when a block is selected at step 708, a determination is made as to whether the block should be included in the segment it is within a predetermined proximity of, or if the block should be excluded from the segment. In one aspect, this determination can be made by taking a quality metric, such as rate distortion, of frame 600. For example, at step 716, a rate distortion measurement can be taken of a first segmentation map 602 that include block 662 with block 650 in segment 10. Step 716 can also take a second rate distortion measurement where block 662 remains amongst the unassigned blocks such as block 606. Step 716 can then compare the measurements and alter the segmentation map 602 at step 740 if the quality measurement indicates an altered segmentation map would result in improved quality. However, if altering the segmentation map determined at step 702 does not result in improved quality, step 710 can encode the segmentation map determined at step 702 or perform an additional analysis at step 720 as shown in FIG. 7.

Step 720 within step 730 may perform the additional step of a cost/quality determination. The cost/quality determination may be a bit-cost analysis to determine if altering the segmentation map determined at step 702 provides a sufficient amount of bit savings prior to altering the segmentation map at step 740. The additional cost/quality step 720 may perform any other form of testing or analysis known in the art to determine if the segmentation map determined at step 702 should be altered at step 740 or if the frame should be encoded at step 710 using the segmentation map determined at step 702. The testing or analysis can be based upon one or more characteristics related to the encoding process. The determination can be made by a program or algorithm stored in the memory 16 and executed by the processor 14.

If a block is not within a predetermined proximity of a segment, then the blocks may be encoded by the entropy encoding stage 52 at step 710 according to the segment map determined at step 702, for example, according to segmentation map 602. In the example segmentation map 602, the segments including blocks 604, 606, 608, 650, and 660 may all be encoded by different coding schemes. For example the entropy encoding stage 52 may select from multiple encoding schemes including but not limited to various types of arithmetic coding, variable length coding, or context adaptive coding. The encoding schemes for each segment may be selected according to any characteristic related to the encoding process.

Although step 734 was discussed above with an EOB indicator as the identified characteristic, step 734 may identify several characteristics that are used alone or in combination to determine how blocks are assigned to various segments. For example, blocks may be assigned to segments based on interframe motion, such that blocks that contain similar motion vector information and similar EOB indicator positions are contained in the same segment. Identifying additional characteristics such as motion vector information for the segmentation process in step 734 may allow process 700 to more cheaply encode certain image characteristics that are less important to image quality as judged by the human visual system (HVS). For example, process 700 may assign more importance to blocks that include a high degree of movement such as block 660 in comparison with background blocks such as block 604. For higher priority segments, process 700 may determine that step 730 should be skipped because including blocks that do not satisfy threshold criteria $Th_k$ could prove more detrimental to video quality as determined by the HVS than would including blocks in a lower priority segment such as segment 1 including block 604.

Furthermore, additional characteristics can help determine the EOB indicator position for a given block. For example, because segment 1 including block 604 is a background portion with little or no changes occurring between frames, the residual quantized transform coefficients are very likely to contain more zero coefficients than in segment 7 including block 660 which may include a relatively high degree of movement. Accordingly, the EOB indicator position for blocks in segment 1, such as block 604, is likely to be a low value such as 1-16, while the EOB indicator positions for blocks in segment 7, such as block 660, are more likely to occur much later in the block because the relatively unpredictable nature of the movement will result in a more complex residual signal with more non-zero quantized transform coefficients.

Accordingly, there can be one or several characteristics in place of or in addition to the EOB indicator position that is used to segment a given frame 600. These characteristics may include but not limited to block location within a frame, frequency of assignment of particular blocks to particular segments in a frame, frequency of particular segment use, encoding scheme, quantizer level, zero bin size, motion vector data, coefficient amplitude data, or coefficient frequency data. Segmentation data can also include other entropy-related information including but not limited to segment-specific entropy coding behavior such as segment specific arithmetic encoder contexts that define the probability of each token (and hence how expensive different tokens are to encode). For example, a segment where the value "one" is common can have a segment-specific entropy context that makes a "one" cheaper to encode.

In some cases, the entropy, EOB position or other information is included for some segments but not others. Where the entropy, EOB position or other information is not included for a segment, the coefficients are encoded at the block level for the blocks in that segment.

Once the selected segmentation map is encoded at step 710, the allocation of blocks to various segments can be explicitly coded in the compressed bitstream 44 or the allocation of blocks may be detected by the decoder 62 implicitly, based upon other information carried in the compressed bitstream 44 or determined algorithmically through analysis of the content or encoding choices in one or more previously encoded frames, for example.

The operation of encoding can be performed in many different ways and can produce a variety of encoded data formats. The above-described embodiments of encoding or decoding illustrate some exemplary encoding techniques. However, it shall be understood that encoding and decoding consistent with embodiments of this disclosure may include other transformations or change of data.

The embodiments of the transmitting station 12 and/or the receiving station 18 (and the algorithms, methods, instructions etc. stored thereon and/or executed thereby) can be realized in hardware, software, or any combination thereof. The hardware (such as processors 14 and 20) can include, for example, intellectual property (IP) cores, application-specific integrated circuits (ASICs), programmable logic arrays, optical processors, programmable logic controllers, microcode, microcontrollers, servers, microprocessors, digital signal processors, or any other suitable circuit or other device capable of manipulating information. In the claims, the term "processor" should be understood as encompassing any the foregoing hardware, either singly or in combination. The terms "signal" and "data" are used interchangeably. Further, portions of transmitting station 12 and receiving station 18 do not necessarily have to be implemented in the same manner.

Further, in one embodiment, for example, the transmitting station 12 or the receiving station 18 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 12 and the receiving station 18 can, for example, be implemented on computers in a screen casting system. Alternatively, the transmitting station 12 can be implemented on a server and the receiving station 18 can be implemented on a device separate from the server, such as a hand-held communications device (e.g., a cell phone). In this instance, transmitting station 12 can encode content using an encoder 40 into an encoded video signal and transmit the encoded video signal to the communications device. In turn, the communications device can then decode the encoded video signal using a decoder 62. Alternatively, the communications device can decode content stored locally on the communications device (i.e., content that was not transmitted by the transmitting station 12). Other suitable transmitting station 12 and receiving station 18 implementation schemes are available. For example, the receiving station 18 can be a generally stationary personal computer rather than a portable communications device and/or a device including an encoder may also include a decoder.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having a plurality of frames, comprising:
transforming coefficients in a plurality of blocks of a current frame of the plurality of frames to generate transform coefficients;
quantizing the transform coefficients to generate quantized transform coefficients, the quantized transform coefficients including zero value quantized coefficients and non-zero value quantized coefficients;
ordering the quantized transform coefficients in each of the plurality of blocks according to a scan order;
identifying, for each block of the plurality of blocks, a value for an entropy-related characteristic associated with the block, the value including at least one of a position of a last non-zero value quantized coefficient of the quantized transform coefficients arranged in the scan order or a number of non-zero value quantized coefficients among the quantized transform coefficients of the block;
assigning, to each of a plurality of segments for the frame, a unique, assigned value corresponding to the entropy-related characteristic;
assigning at least some of the plurality of blocks to a segment of the plurality of segments based on a comparison of the value for the entropy-related characteristic associated with the block and the unique, assigned value for the segment; and
encoding the at least some of the plurality of blocks assigned to the segment of the plurality of segments without encoding an end of block indictor for each block of the at least some of the plurality of blocks.

2. The method of claim 1, wherein identifying, for each block of the plurality of blocks, the value for the entropy-related characteristic associated with the block comprises identifying a type of quantization process used to quantize the transform coefficients associated with the block.

3. The method of claim 1, further comprising:
modifying the value for the entropy-related characteristic associated with a block; and
determining if the modification of the value of the entropy-related characteristic results in an improvement based on a cost/quality metric.

4. The method of claim 1, further comprising:
determining a segment map based at least in part on the assignment of the at least some of the blocks to the segment;
modifying the segment map; and
determining if the modification of the segment map results in an improvement based on a cost/quality metric.

5. The method of claim 1, further comprising encoding all blocks assigned to the segment with a same end of block position.

6. The method of claim 1, wherein the segment is encoded with one of a plurality of selectable encoding schemes.

7. The method of claim 1, wherein identifying, for each block of the plurality of blocks, the value for the entropy-related characteristic includes identifying at least one of: a location of the block within the current frame, a frequency with which the plurality of blocks are assigned to particular segments of the plurality of segments, a frequency with which a particular segment of the plurality of segments is used, an encoding scheme, a quantizer level, a zero bin size, or a value derived from a motion vector.

8. The method of claim 1, wherein the value for the entropy-related characteristic includes the number of non-zero value quantized coefficients, and wherein assigning the at least some of the plurality of blocks to a segment comprises:
   comparing the number of non-zero value quantized coefficients among the quantized transform coefficients of a block of the plurality blocks to the unique, assigned value of at least some of the plurality of segments; and
   assigning the block of the plurality of blocks to a segment whose unique, assigned value is equal to the number of non-zero value quantized coefficients among the quantized transform coefficients of the block.

9. The method of claim 1, wherein the value for the entropy-related characteristic includes the position of the last non-zero value quantized coefficient, and wherein assigning the at least some of the plurality of blocks to a segment comprises:
   comparing the position of the last non-zero value quantized coefficient of the quantized transform coefficients of a block of the plurality of blocks to the unique, assigned value of at least some of the plurality of segments; and
   assigning the block of the plurality of blocks to a segment whose unique, assigned value is a position in the scan order greater than or equal to the same position as the position of the last non-zero value quantized coefficient of the quantized transform coefficients of the block.

10. The method of claim 1, further comprising:
   encoding each block of the plurality of blocks not assigned to a segment of the plurality of segments with a respective end-of-block indicator.

11. The method of claim 1, wherein assigning the at least some of the plurality of blocks to a segment further comprises:
   assigning the at least some of the plurality of blocks to a segment including blocks having the same values for the entropy-related characteristic.

12. A method for encoding a video signal having a plurality of frames, comprising:
   transforming coefficients in a plurality of blocks of a current frame to generate transform coefficients;
   quantizing the transform coefficients using a quantization process to generate quantized transform coefficients;
   ordering the quantized transform coefficients according to a scan order;
   identifying, for each block of the plurality of blocks, a characteristic associated with at least one of the transform coefficients or the quantization process, wherein the characteristic includes at least one of a position of a last non-zero quantized coefficient of the quantized transform coefficients arranged in the scan order, a number of non-zero quantized coefficients among the quantized transform coefficients of the block, or a number of zero value quantized coefficients among the quantized transform coefficients of the block;
   determining, for a plurality of segments, a threshold criteria for the characteristic;
   comparing the criteria for each segment with the characteristic for each block of the plurality of blocks using a processor;
   assigning at least some blocks of the plurality of blocks to a segment based on the comparison; and
   encoding the plurality of blocks by encoding the at least some blocks of the plurality of blocks assigned to the segment without encoding an end of block indictor for each block of the at least some blocks and encoding each block of the plurality of blocks not assigned to one of the plurality of segments with a respective end-of-block indicator.

13. The method of claim 12, further comprising:
   making a cost/quality metric determination if the characteristic is within a predetermined proximity of the threshold criteria for a segment based on the comparison.

14. The method of claim 13, further comprising:
   altering a quantization characteristic of at least one block to modify the characteristic for the at least one block if an improved cost/quality metric results from the alteration.

15. The method of claim 13, further comprising:
   altering a segmentation map if an improved cost/quality metric results from the alteration.

16. The method of claim 13, further comprising:
   altering an encoding characteristic for at least one block if an improved cost/quality metric results from the alteration.

17. The method of claim 12, wherein the segment is encoded with one of a plurality of selectable encoding schemes.

18. The method of claim 12, wherein the threshold criteria is determined as a function of at least two characteristics.

19. An apparatus for encoding a video signal having a plurality of frames, comprising:
   a memory; and
   a processor in communication with the memory, the processor configured to execute instructions stored in the memory to:
   transform coefficients in a plurality of blocks to generate quantized transform coefficients;
   quantize the transform coefficients to generate quantized transform coefficients, the quantized transform coefficients including zero value quantized coefficients and non-zero value quantized coefficients;
   order the quantized transform coefficients in at least one of the plurality of blocks according to a scan order;
   identify, for each block of the plurality of blocks, an entropy-related characteristic associated with the block, the entropy-related characteristic including at least one of a position of a last non-zero value quantized coefficient of the quantized transform coefficients arranged in the scan order, a number of non-zero value quantized coefficients among the quantized transform coefficients of the block, or a number of zero value quantized coefficients among the quantized transform coefficients of the block;
   assign, to each of a plurality of segments for the frame, a unique, assigned value corresponding to the entropy-related characteristic;
   assign at least some of the plurality of blocks to a segment of the plurality of segments based on a comparison of the value for the entropy-related characteristic associated with the block and the unique, assigned value for the segment; and
   encode the at least some of the plurality of blocks assigned to the segment of the plurality of segments without encoding an end of block indictor for each block of the at least some of the plurality of blocks.

20. The apparatus of claim 19, wherein the entropy-related characteristic is based on a type of quantization process used to quantize the transform coefficients associated with the plurality of blocks.

21. The apparatus of claim 19, wherein the processor is further configured to execute instructions stored in the memory to:
 modify the entropy-related characteristic associated with the at least some of the plurality of blocks; and
 determine if the modification of the entropy-related characteristic results in an improvement based on a cost/quality metric.

22. The apparatus of claim 19, wherein each block of the at least some blocks assigned to the segment has the same entropy-related characteristic.

23. The apparatus of claim 19, wherein the unique, assigned value is a maximum position for an end-of-block indicator such that the at least some of blocks assigned to the segment each has an end-of-block position less than or equal to the maximum position.

24. The apparatus of claim 19, wherein the unique, assigned value is a defined number of non-zero quantized coefficients such that the at least some of blocks assigned to the segment each has a number of non-zero quantized coefficients equal to the defined number.

25. The apparatus of claim 19, wherein the unique, assigned value is a defined position for an end-of-block indicator such that the at least some of blocks assigned to the segment have an end-of-block position equal to the defined position.

\* \* \* \* \*